UNITED STATES PATENT OFFICE.

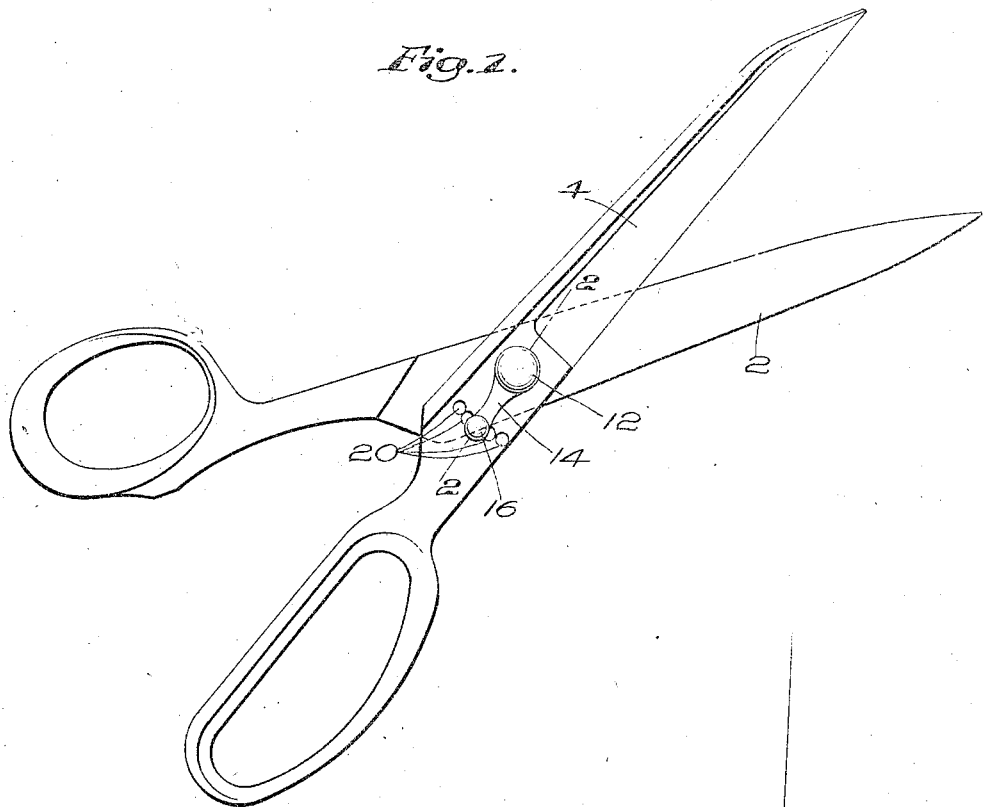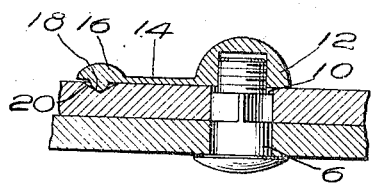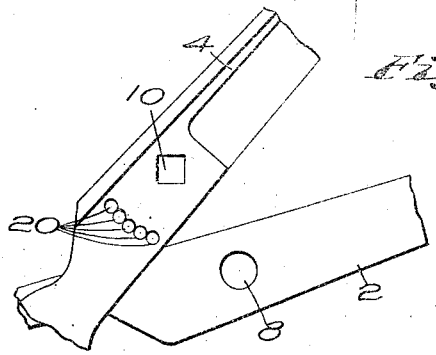

GEORGE WENTWORTH GOUDEY, OF BOSTON, MASSACHUSETTS, ASSIGNOR OF ONE-THIRD TO EUNICE ANTOINETTE GOUDEY, OF BOSTON, MASSACHUSETTS.

SHEARS.

1,059,864.  Specification of Letters Patent.  Patented Apr. 22, 1913.

Application filed June 27, 1912. Serial No. 706,138.

*To all whom it may concern:*

Be it known that I, GEORGE WENTWORTH GOUDEY, a citizen of the United States, residing at Boston, in the county of Suffolk and State of Massachusetts, have invented certain new and useful Improvements in Shears; and I do hereby declare the following to be a full, clear, and exact description of the invention, such as will enable others skilled in the art to which it appertains to make and use the same.

The present invention relates to shears and the like.

The object of the present invention is to provide a device for tightening the pivotal connection between the two members of the shears, particularly to compensate for wear.

With the above object in view, the present invention consists in the improvement in shears and the like hereinafter described and particularly pointed out in the claims.

In the accompanying drawings which illustrate the preferred embodiment of the present invention, Figure 1 is a plan view of a pair of shears embodying the present invention; Fig. 2 is a section on the line 2—2 of Fig. 1; and Fig. 3 is a fragmentary view showing the stud-receiving holes and the detent-receiving apertures in the shear arms.

Referring to the drawings, the shears comprise two blade members or arms 2 and 4 respectively, which are pivotally connected by a headed stud 6. The shank of the stud 6 next its head is round and is mounted to rotate in a round hole 8 in the arm 2. The part of the stud shank which is received through the arm 4 is squared and is mounted to slide but not to rotate in a square hole 10 in the arm 4. The end of the stud 6 is screwthreaded to receive a nut 12 which can be turned to draw the two arms 4 and 2 together and tighten the pivotal connection between them.

A device for locking the nut 12 in adjusted position is provided and consists in a spring finger 14 extending along the surface of the arm 4 toward the handle and terminating in a small knob 16, on the underside of which is formed a detent projection 18 which is arranged to engage in shallow recesses 20 formed in the face of the arm 4.

In assembling the shears, the stud 4 is passed through the alined holes 8 and 10 and is set in the square hole 10 in such a position that when the nut 12 is turned in place the detent 18 will engage in one of the recesses 20. It is to be noted that since the hole 10 is square, the stud 6 can be set in four positions, in one of which the spring finger 14 will extend toward the handle of the shears, as illustrated. As the shears are used the bearing surfaces of the arms 2 and 4 become worn, so that the shears become loose. This loosening of the shears hinge or joint is readily compensated for by moving the spring finger 14 to tighten the nut 12. The finger 14 is of resilient material, so that it holds the projection 18 in the recesses 20 and securely locks the nut 12 in its adjusted position.

While the present invention has been described in connection with, and is particularly applicable to shears, it is to be understood, however, that it is not limited to shears alone, but may be employed to tighten the pivotal connection between any two pivotally connected arms, and therefore the expression "shears", as used in the specification and claims, is intended to define a construction having pivotally connected arms, like shear arms or blades.

The present invention is not limited to the preferred embodiment herein specifically illustrated and described, but may be embodied in other constructions within the scope of the invention as defined in the following claims.

I claim—

1. Shears having, in combination, two pivotally connected arms, a headed stud received through alined holes in said arms to form the pivotal connection between them and rotatably mounted in one arm and non-rotatably mounted to slide in the second arm, a nut screwthreaded on the stud for drawing the arms together and tightening the connection between them, and a spring finger on the nut having a detent engaging recesses in the second arm for locking the nut in adjusted position, substantially as described.

2. Shears having, in combination, two pivotally connected arms, a headed stud received through alined holes in said arms to form the pivotal connection between them and mounted in a round hole in one arm and in a square hole in the second arm, a nut screwthreaded on the stud for drawing the arms together and tightening the connection between them, and a detent connection between the nut and the second arm for locking the nut from turning relatively thereto, whereby the nut is locked in adjusted position on the stud, substantially as described.

GEORGE WENTWORTH GOUDEY.

Witnesses:
EDWARD T. BLANCHARD,
B. L. SNOW.